(12) United States Patent
Fischer et al.

(10) Patent No.: US 7,558,817 B2
(45) Date of Patent: Jul. 7, 2009

(54) APPARATUS AND METHOD FOR CALCULATING A RESULT OF A MODULAR MULTIPLICATION

(75) Inventors: Wieland Fischer, Munich (DE); Holger Sedlak, Lochhofen (DE); Jean-Pierre Seifert, Munich (DE)

(73) Assignee: Infineon Technologies AG (DE)

( * ) Notice: Subject to any disclaimer, the term of this patent is extended or adjusted under 35 U.S.C. 154(b) by 688 days.

(21) Appl. No.: 10/977,561

(22) Filed: Oct. 28, 2004

(65) Prior Publication Data

US 2005/0149595 A1     Jul. 7, 2005

Related U.S. Application Data

(63) Continuation of application No. PCT/EP03/04426, filed on Apr. 28, 2003.

(30) Foreign Application Priority Data

Apr. 29, 2002   (DE) ................. 102 19 158

(51) Int. Cl.
*G06F 7/38*     (2006.01)
*G06F 15/00*    (2006.01)

(52) U.S. Cl. .................... 708/491; 708/492
(58) Field of Classification Search ......... 708/491–492, 708/490
See application file for complete search history.

(56) References Cited

U.S. PATENT DOCUMENTS 4,346,451 A * 8/1982 Katayama ............ 708/491

| | | |
|---|---|---|
| 5,287,508 A | 2/1994 | Hejna, Jr. et al. |
| 5,640,398 A | 6/1997 | Carr et al. |
| 5,878,228 A | 3/1999 | Miller et al. |
| 6,795,553 B1 * | 9/2004 | Kobayashi et al. ......... 708/492 |
| 6,920,473 B2 * | 7/2005 | Elbe et al. ................ 708/492 |
| 7,277,540 B1 * | 10/2007 | Shiba et al. .............. 708/492 |

FOREIGN PATENT DOCUMENTS

| DE | 36 31 992 A1 | 11/1987 |
|---|---|---|
| DE | 690 32 811 T2 | 4/1999 |
| WO | WO-02/33885 A1 | 4/2002 |

OTHER PUBLICATIONS

Paillier; "Low-Cost Double Size Modular Exponentiation or How to Stretch Your Cryptoprocessor"; Public Key Cryptography; Second International Workshop on Practice and Theory in Public Key Cryptography, PKC'99; pp. 223-234, XP002274671, 1999, Berlin, Germany, Springer-Verlag.

(Continued)

*Primary Examiner*—Chat C Do
(74) *Attorney, Agent, or Firm*—Dickstein, Shapiro, LLP.

(57) ABSTRACT

Apparatus for calculating a result of a modular multiplication of a first operand and a second operand with regard to a modulus, each having a length of 2 n bits, the operands and the modulus are split into sub-operands of half the length and are fed to controller controlling MMD unit for performing a MultModDiv operation in accordance with a predetermined step sequence with corresponding input operands and MMD moduli to obtain integer quotient values and residual values with regard to the MMD modulus at an output. The combiner is operable to combine integer quotient values and residual values from predetermined steps of the step sequence to obtain the result.

14 Claims, 8 Drawing Sheets

OTHER PUBLICATIONS

Dugdale; "Residue Multipliers Using Factored Decomposition"; IEEE Transactions on Circuits and Systems II: Analog and Digital Signal Processing, IEEE Inc., New York, US, vol. 41, No. 9, Sep. 1, 1994, pp. 623-627, XP000468163.

Fischer, W., et al.; "Increasing the Bitlength of a Crypto-Coprocessor"; Cryptographic Hardware and Embedded Systems, International Workshop, Aug. 13, 2002. CHES 2002, LNCS 2523, pp. 71-81, XP00160522.

* cited by examiner $$A = A_b + 2^n \cdot A_t$$

$$R := (A \cdot B) \bmod N$$

$$R := \frac{A \cdot B}{N}$$

$$\Longrightarrow A \cdot B = Q N + R$$

Input: $N = N_t 2^n + N_b$ with $0 \le N_b < 2^n$,
$A = A_t 2^n + A_b$ with $0 \le A_b < 2^n$,
$B = B_t 2^n + B_b$ with $0 \le B_b < 2^n$ $E := A \cdot B \bmod N$
(without initialization)

51 — $(Q^{(1)}, R^{(1)}) := \text{MultModDiv}(B_t, 2^n, N_t)$
52 — $(Q^{(2)}, R^{(2)}) := \text{MultModDiv}(Q^{(1)}, N_b, 2^n)$
53 — $(Q^{(3)}, R^{(3)}) := \text{MultModDiv}(A_t, R^{(1)}-Q^{(2)}+B_b, N_t)$
54 — $(Q^{(4)}, R^{(4)}) := \text{MultModDiv}(A_b, B_t, N_t)$
55 — $(Q^{(5)}, R^{(5)}) := \text{MultModDiv}(Q^{(3)}+Q^{(4)}, N_b, 2^n)$
56 — $(Q^{(6)}, R^{(6)}) := \text{MultModDiv}(A_t, R^{(2)}, 2^n)$
57 — $(Q^{(7)}, R^{(7)}) := \text{MultModDiv}(A_b, B_b, 2^n)$ Output: $(R^{(3)}+R^{(4)}-Q^{(5)}-Q^{(6)}+Q^{(7)}) * 2^n + (R^{(7)}-R^{(6)}-R^{(5)})$ — 58

FIGURE 5
(general multiplication)

Input: $N = N_t 2^n + N_b$ with $0 \le N_b < 2^n$,
$A = A_t 2^n + A_b$ with $0 \le A_b < 2^n$,
$B = B_t 2^n + B_b$ with $0 \le B_b < 2^n$ $E := A \cdot B \bmod N$
(with initialization)

61 — $(Q^{(1)}, R^{(1)}) := \text{MultModDiv}(A_t, B_t, N_t)$
62 — $(Q^{(2)}, R^{(2)}) := \text{MultModDivInit}(N_b, -Q^{(1)}, R^{(1)}, N_t)$
63 — $(Q^{(3)}, R^{(3)}) := \text{MultModDiv}(A_t, B_b, N_t)$
64 — $(Q^{(4)}, R^{(4)}) := \text{MultModDiv}(A_b, B_t, N_t)$
65 — $(Q^{(5)}, R^{(5)}) := \text{MultModDiv}(A_b, B_b, 2^n)$
66 — $(Q^{(6)}, R^{(6)}) := \text{MultModDiv}(Q^{(2)}+Q^{(3)}+Q^{(3)}, N_b, 2^n)$
67 — Output: $(R^{(2)}+R^{(3)}+R^{(4)}+Q^{(5)}-Q^{(6)}) * 2^n + (R^{(5)}-R^{(6)})$

FIGURE 6
(general multiplication)

(squaring)

(squaring)

90a → $(A_t Z + A_b)*(B_t Z + B_b)$ $\qquad Z := 2^n$

91 → $= A_t B_t ZZ + A_t B_b Z + A_b B_t Z + A_b B_b$ $= A_t (Q^{(1)} N_t + R^{(1)}) Z + A_t B_b Z + A_b B_t Z + A_b B_b \quad$ ←—92

93 → $\equiv A_t R^{(1)} Z - A_t Q^{(1)} N_b + A_t B_b Z + A_b B_t Z + A_b B_b \quad (N_t Z \equiv -N_b \bmod N)$ ←—93

94 → $= A_t R^{(1)} Z - A_t (Q^{(2)} Z + R^{(2)}) + A_t B_b Z + A_b B_t Z + A_b B_b$ $\equiv A_t (R^{(1)} - Q^{(2)} + B_b) Z - A_t R^{(2)} + A_b B_t Z + A_b B_b \quad (N_t Z \equiv -N_b \bmod N)$ $= (Q^{(3)} N_t + R^{(3)}) Z - A_t R^{(2)} + A_b B_t Z + A_b B_b$ $= (Q^{(3)} N_t + R^{(3)}) Z - A_t R^{(2)} + (Q^{(4)} N_t + R^{(4)}) Z + A_b B_b$ $\equiv (R^{(3)} + R^{(4)}) Z - (Q^{(3)} + Q^{(4)}) N_b - A_t R^{(2)} + A_b B_b \quad (N_t Z \equiv -N_b \bmod N)$ $= (R^{(3)} + R^{(4)}) Z - (Q^{(5)} Z + R^{(5)}) - A_t R^{(2)} + A_b B_b$ $= (R^{(3)} + R^{(4)}) Z - (Q^{(5)} Z + R^{(5)}) - (Q^{(6)} Z + R^{(6)}) + A_b B_b$ $= (R^{(3)} + R^{(4)}) Z - (Q^{(5)} Z + R^{(5)}) - (Q^{(6)} Z + R^{(6)}) + (Q^{(7)} Z + R^{(7)})$ $= (R^{(3)} + R^{(4)} - Q^{(5)} - Q^{(6)} + Q^{(7)}) Z + (R^{(7)} - R^{(6)} - R^{(5)})$

FIGURE 9A
(multiplic. without initialization)

90b → $(A_t Z + A_b)*(B_t Z + B_b)$ $\qquad Z := 2^n$ $= A_t B_t ZZ + A_t B_b Z + A_b B_t Z + A_b B_b$ $= (Q^{(1)} N_t + R^{(1)}) ZZ + A_t B_b Z + A_b B_t Z + A_b B_b$ 95 → $\equiv (R^{(1)} Z - Q^{(1)} N_b) Z + A_t B_b Z + A_b B_t Z + A_b B_b \quad (N_t Z \equiv -N_b \bmod N)$ 96 → $= (Q^{(2)} N_t + R^{(2)}) Z + A_t B_b Z + A_b B_t Z + A_b B_b$ $\equiv (R^{(2)} Z - Q^{(2)} N_b) + A_t B_b Z + A_b B_t Z + A_b B_b \quad (N_t Z \equiv -N_b \bmod N)$ $= (R^{(2)} Z - Q^{(2)} N_b) + (Q^{(3)} N_t + R^{(3)}) Z + A_b B_t Z + A_b B_b$ $= (R^{(2)} Z - Q^{(2)} N_b) + (Q^{(3)} N_t + R^{(3)}) Z + (Q^{(4)} N_t + R^{(4)}) Z + A_b B_b$ $= (R^{(2)} Z - Q^{(2)} N_b) + (Q^{(3)} N_t + R^{(3)}) Z + (Q^{(4)} N_t + R^{(4)}) Z + (Q^{(5)} Z + R^{(5)})$ $\equiv (R^{(2)} + R^{(3)} + R^{(4)} + Q^{(5)}) Z - (Q^{(2)} + Q^{(3)} + Q^{(4)}) N_b + R^{(5)} \quad (N_t Z \equiv -N_b \bmod N)$ $= (R^{(2)} + R^{(3)} + R^{(4)} + Q^{(5)}) Z - (Q^{(6)} Z + R^{(6)}) + R^{(5)}$ $= (R^{(2)} + R^{(3)} + R^{(4)} + Q^{(5)} - Q^{(6)}) Z + (R^{(5)} - R^{(6)})$

FIGURE 9B
(multiplic. with initialization)

100

$(A_t Z + A_b)^2 =$ $A_t A_t ZZ + 2A_t A_b Z + A_b^2 =$ $A_t (Q^{(1)} N_t + R^{(1)}) Z + 2 A_t A_b Z + A_b^2 =$ $A_t (R^{(1)} Z - Q^{(1)} N_b) + 2 A_t A_b Z + A_b^2 =$ $A_t R^{(1)} Z - A_t (Q^{(2)} Z + R^{(2)}) + 2 A_t A_b Z + A_b^2 =$ $A_t (R^{(1)} - Q^{(2)} + 2 A_b) Z - A_t R^{(2)} + A_b^2 =$ $(Q^{(3)} N_t + R^{(3)}) Z - A_t R^{(2)} + A_b^2 =$ $R^{(3)} Z - Q^{(3)} N_b - A_t R^{(2)} + A_b^2 =$ $R^{(3)} Z - (Q^{(4)} Z + R^{(4)}) - (Q^{(5)} Z + R^{(5)}) + (Q^{(6)} Z + R^{(6)}) =$ $(R^{(3)} - Q^{(4)} - Q^{(5)} + Q^{(6)}) Z + (R^{(6)} - R^{(5)} - R^{(4)})$ $Z := 2^n$

FIGURE 10
(squaring)

APPARATUS AND METHOD FOR CALCULATING A RESULT OF A MODULAR MULTIPLICATION

CROSS-REFERENCE TO RELATED APPLICATIONS

This application is a continuation of International Application No. PCT/EP03/04426, filed Apr. 28, 2003, which designated the United States and was not published in English, and which is incorporated herein by reference in its entirety.

BACKGROUND OF THE INVENTION

1. Field of the Invention

The present invention relates to computing algorithms, and in particular to computing algorithms required for cryptographic applications.

2. Description of the Related Art

Key lengths are steadily increasing especially in public-key cryptography, but also in other fields of cryptography. This is because security requirements placed upon such cryptographic algorithms are also increasing. The use of the RSA method as a representative of an asymmetric cryptography concept, that is to say the use of a public-key method, increases security from so-called brute-force attacks as the key length used increases. Brute-force attacks are attacks on a cryptographic algorithm wherein a key is to be inferred from trying out all possibilities. It is immediately evident that the amount of time theoretically required for a brute-force attack in order to try out all possibilities greatly increases as the key length increases.

It shall be pointed out in this context that RSA applications with key lengths of 512 bits formerly used to be considered sufficient. Due to technical and mathematical progress made by the "other side", the key lengths for typical RSA applications were then increased to 1024 bits. Nowadays there are various people who claim that even this key length is not sufficient, so that RSA key lengths of 2048 bits are aimed at.

On the other hand, when considering existing cryptographic coprocessors, such as on SmartCards, it can be seen that there is a desire, of course, to also permit RSA applications with key lengths of, for example, 2048 bits, to run on cryptographic circuits which have actually been developed for key lengths of, for example, 1024 bits only. Thus, arithmetic coprocessors for existing SmartCard applications are characterized by the very fact that they have been developed for a specified bit length which is not suitable, i.e. too short, for most recent security requirements. This leads to the fact that, for example, a 2048-bit RSA algorithm cannot be efficiently handled on 1024-bit coprocessors. For RSA applications, the Chinese Remainder Theorem (CRT) has been known, wherein a modular exponentiation with a large key length is broken down into two modular exponentiations with half the key length, whereupon the results of both modular exponentiations of half the length are combined accordingly.

Recently it has turned out that the Chinese Remainder Theorem is particularly susceptible to DFA attacks (DFA=differential fault analysis).

One problem associated with many methods therefore is the "doubling" of so-called modular multiplication, which is a central operation in cryptographic calculations. Thus, a modular exponentiation may be broken down into many modular multiplications, i.e. into an operation wherein a product of a first operand A and of a second operand B is calculated in a residual class with regard to a modulus N. If the operands A and B have a length of 2 n bits each, calculating units having a length of 2 n bits are typically used. These calculating units are referred to as long-number calculating units because of their long lengths, as opposed to, for example, 8-bits, 16-bits, 32-bits or 64-bits architectures employed, for example, for PC- or workstation processors.

Therefore there is a desire to implement a modular multiplication A*B mod N with numbers A, B and N of a bit length of 2 n on an n-bits calculating unit. This is very time consuming, since the numbers A, B, N, . . . may only ever be loaded fraction by fraction, which is why conventional methods require a large amount of organization and are error-prone, if they do not fail completely. There are several methods in the art with which this problem has been solved so far. These methods have been known by the keywords of Montgomery multiplication, normal multiplication, e.g. with Karatsuba-Ofman, and a subsequent reduction, such as Barret reduction.

Another concept making use of a Montgomery calculation in a "CRT window" has been set forth in P. Pailler, "Low-cost double size modular exponentiation or how to stretch your cryptocoprocessor".

All such concepts are expensive in terms of calculating time and data organization and are therefore not always efficient.

SUMMARY OF THE INVENTION

It is an object of the present invention to provide a concept for calculating a result of a modular multiplication which may be efficiently used with regard to implementation and calculating time.

In accordance with a first aspect, the present invention provides an apparatus for calculating a result of a modular multiplication of a first operand and a second operand in relation to a modulus, the first operand, the second operand and the modulus having a first length of bits, the apparatus, having a provider for providing a first sub-operand and a second sub-operand from the first operand, a first sub-operand, a second sub-operand from the second operand, a first sub-modulus and a second sub-modulus from the modulus, which have a second length of bits which is shorter than the first length of bits, an MMD unit for performing an MMD operation, an MMD operation being defined to provide, from a term, an integer quotient value and a residual value with regard to an MMD modulus; a controller for feeding the MMD unit with predetermined combinations of input operands and associated MMD moduli in accordance with a predetermined step sequence, the input operands and MMD moduli being based on the first and second sub-operands of the first operand, on the first and second sub-operands of the second operand, on the first and second sub-moduli of the modulus, on integer quotient values and residual values from steps in the predetermined step sequence, and on a factor $2^x$, x equaling the second length of bits; and a combiner for combining integer quotient values and residual values from predetermined steps of the step sequence so as to obtain the result.

In accordance with a second aspect, the present invention provides a method for calculating a result of a modular multiplication of a first operand and a second operand in relation to a modulus, the first operand, the second operand and the modulus having a first length of bits, the method with the steps of providing a first sub-operand and a second sub-operand from the first operand, a first sub-operand, a second sub-operand from the second operand, a first sub-modulus and a second sub-modulus from the modulus, which have a second length of bits which is shorter than the first length of bits; performing an MMD operation, an MMD operation being defined to provide, from a term, an integer quotient value and a residual value with regard to an MMD modulus; feeding the MMD unit with predetermined combinations of input operands and associated MMD moduli in accordance with a predetermined step sequence, the input operands and MMD moduli being based on the first and second sub-operands of the first operand, on the first and second sub-operands of the second operand, on the first and second sub-moduli of the modulus, on integer quotient values and residual values from steps in the predetermined step sequence, and on a factor $2^x$, x equaling the second length of bits; and combining integer quotient values and residual values from predetermined steps of the step sequence so as to obtain the result.

The present invention is based on the findings that a modular modification of two operands in relation to a modulus, the operands and the modulus having a length of, for example, 2 n bits, may be transformed into a predetermined step sequence of MultModDiv operations by sub-operands $A_t$, $A_b$, $B_t$ and/or sub-moduli $N_t$, $N_b$ of a shorter length, such as n bits. The MultModDiv operations (MMD operations) work with the sub-operands and/or sub-moduli of a shorter length, for example half the length. In the MultModDiv operation the result of the known Div operation is also inserted in addition to the MultMod operation, which provides the remainder of a modular multiplication. The result of the Div operation, i.e. the integer quotient of the modulus, is calculated in addition to the remainder in an MMD operation. Performing such an MMD operation several times with input parameters and moduli dependent on the predetermined step sequence gives rise to integer quotient values and residual values resulting from predetermined steps of the step sequence, which all have the shorter bit length, for example n bits, and which—also by an n-bits adder, for example,—may be added up and written into a result memory location at respective places.

The basis used for this is an approach $(A_t*2^n+A_b)(B_t*2^n+B_b)$ as a conditional equation for deriving a preferred predetermined step sequence. Multiplying out the expression gives rise to different products which are replaced step by step by an MMD operations. The modular reduction, i.e. it is then A*B mod N that is to be calculated, is taken into account by the equivalence $N_t*2^n=-N_b$.

The index "t" refers to the top bits of an operand A, B and/or of a modulus N, whereas the index "b" (b=bottom) represents the bottom bits of the respective number. Thus, the operand A, for example, results as $A_t*2^n+A_b$. The same goes for modulus N and the second operand B. Due to the fact that, as has been set forth, the partial products are replaced step by step by MMD operations, so that only products of numbers of a length shorter than n bits with a factor of $2^n$ or numbers of a length of n bits will remain after a plurality of replacement steps, the combining orientation may also be implemented as an n-bits adder to combine, on the one hand, the intermediate results multiplied by the factor of $2^n$, and to combine, on the other hand, the intermediate results to which a factor of $2^n$ has not been applied.

The result of the modular multiplication by operands and/or a modulus of a length of 2 n bits is, of course, again a bit count of 2 n, which is combined in a result memory by writing the sum of the intermediate results without the factor $2^n$ into the low-order bits of the result memory, whereas the sum of the intermediate results to which $2^n$ has been applied are written to the top bits of the result memory, it being possible that a carry from the bottom bits in the result memory to the top bits in the result memory which might exist is to be readily taken into account.

One advantage of the present invention is that the inventive concept allows the use of calculating units having relatively short lengths for numbers having relatively long lengths.

Another advantage of the present invention is that the inventive concept is efficient. A comparison of an implementation of the inventive concept on the Advanced Crypto Engine of Infineon Technologies, Munich, with an implementation of Pailler's concept, which has been cited in the introduction of the present description, shows a reduction in the execution time of, for example, RSA, by 40%.

A further advantage of the present invention is the fact that the Div information, that is the integer quotient, may be obtained from the MultMod operation either by means of software or by means of hardware and by means of methods which are easy to implement, the MultMod operation typically being implemented on each multi-purpose cryptography processor. In modulo-arithmetic as is typically employed in modern cryptosystems, the result of the Div operation, that is the integer quotient in relation to the modulus, has been neglected so far because it has not been needed. In accordance with the invention, this information is now no longer simply ignored but is calculated and used to perform calculations with longer operands on shorter calculating units.

A further advantage of the present invention is that the Div operation may often be calculated merely by making changes in the controller of a cryptography processor without having to make changes in the calculating unit, which is actually hard-wired. From that point of view, the MMD operation requires the same amount of time as the MultMod operation, but provides additional information on top of the Mod result, to be precise the Div result, which is used in accordance with the invention.

BRIEF DESCRIPTION OF THE DRAWINGS

These and other objects and features of the present invention will become clear from the following description taken in conjunction with the accompanying drawings, in which:

FIG. 5 shows a preferred embodiment for a predetermined step sequence, wherein only MMD operations are used;

FIG. 6 shows a preferred embodiment for a predetermined step sequence, wherein an initializing MMD operation is used;

FIG. 9 shows a representation for deriving the predetermined step sequence of FIG. 5 from a factorization of the operands A, B and of the modulus N;

FIG. 10 shows a representation of the derivation of the predetermined step sequence of FIG. 7 from the factorization of the operands A, B and of the modulus N.

DESCRIPTION OF THE PREFERRED EMBODIMENTS

Figure 1:
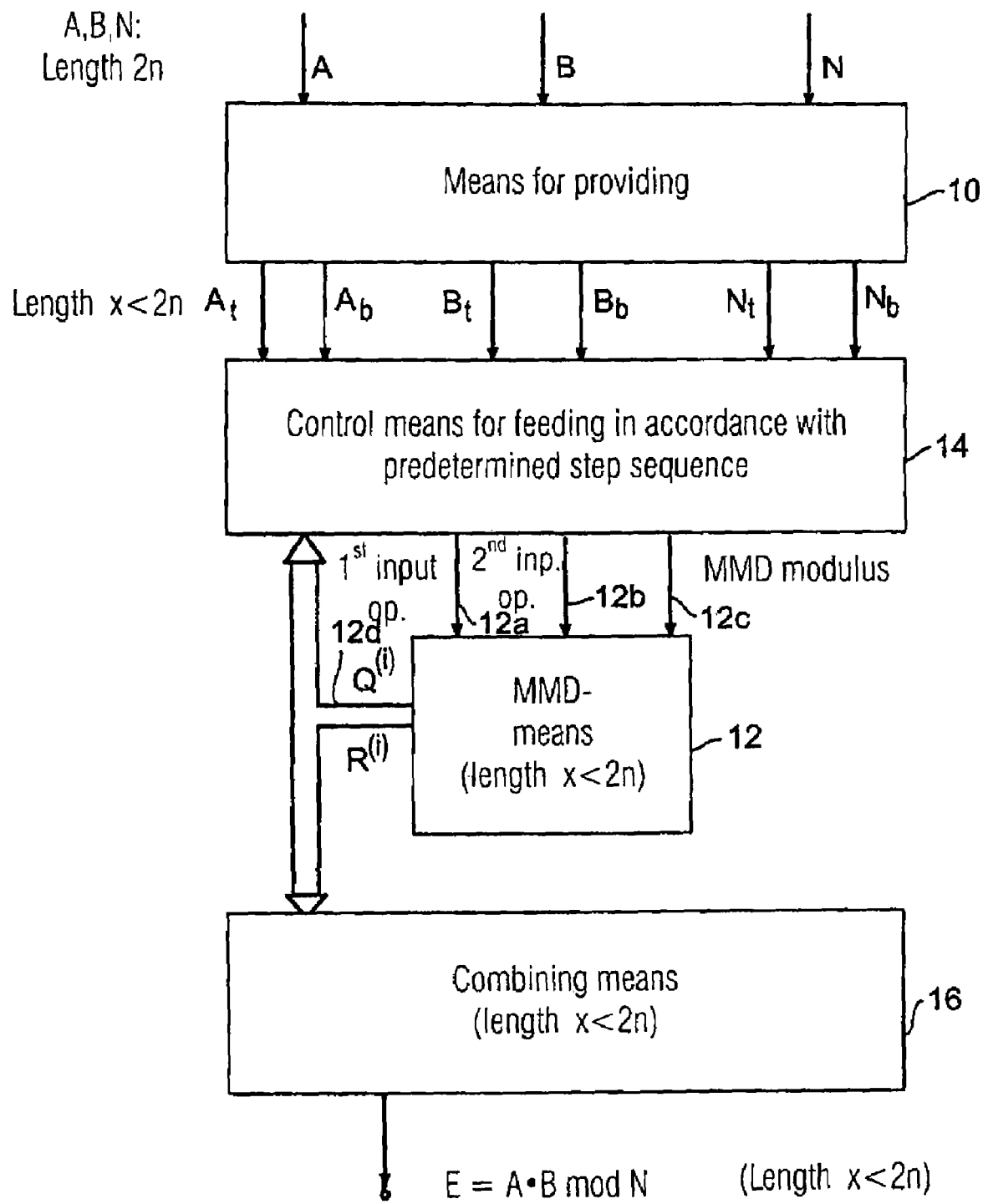
FIG. 1 shows a block diagram of an apparatus in accordance with an embodiment of the present invention.

FIG. 1 shows a block diagram of an inventive apparatus for calculating a result of a modular multiplication of a first operand A and a second operand B in relation to a modulus N, the first and second operands as well as the modulus having a first length of bits, for example the length of 2 n bits. The operands are fed into means 10 for providing sub-operands. The sub-operands provided by means 10 are the sub-operands $A_t$, $A_b$, which are generated from the first operand A. The means 10 for providing further provide the sub-operands $B_t$, $B_b$ generated from the second operand B. Finally, the means 10 for providing provide the sub-moduli $N_t$, $N_b$ generated from the modulus N. The variables $A_t$, $A_b$, $B_t$, $B_b$, $N_t$, and $N_b$ have a shorter length than the original numbers A, B, N. In a preferred embodiment of the present invention, wherein maximum success is achieved, i.e. wherein the modular multiplication may be performed with the shortest calculating unit, the sub-operands and/or sub-moduli have a length n, that is to say they are half as long as the respective "original operands".

The inventive apparatus further includes MMD means 12, whose bit length equals the that of the largest sub-operand and/or sub-modulus. If all the sub-operands and sub-moduli have the same length of n bits, the MMD means also have a length of n bits. The MMD operation is defined such that an integer quotient value $Q^{(i)}$ and a residual value $R^{(i)}$ are to be calculated from two input operands, which are fed into the MMD means via inputs 12a, 12b, and from an MMD modulus provided via a third input 12c, and such that said quotient value and residual value are to be output at an output 12d connectable both to control means 14 and to combining means 16. The control means 14 for feeding the MMD means with predetermined combinations of input operations and associated MMD moduli perform this feeding step by step in accordance with a predetermined step sequence, the input operands and MMD moduli being based upon the first sub-operand $A_t$ and the second sub-operand $A_b$ of the first operand A, on the first sub-operand $B_t$ and the second sub-operand $B_b$ of the second operand B, on the first sub-modulus $N_t$ and the second sub-modulus $N_b$ of the modulus N, on the variable $2^x$ and integer quotient values and residual values of previous steps in the predetermined step sequence, x, in particular, being shorter than 2 n and, in a preferred embodiment, equaling n, i.e. equaling the maximum length of the numbers made available to the control means 14.

The combining means 16 are implemented to combine integer quotient values and residual values from predetermined steps of the predetermined step sequence so as to obtain the result E=A*B mod N, which again has a length of 2 n bits.

Figure 2:
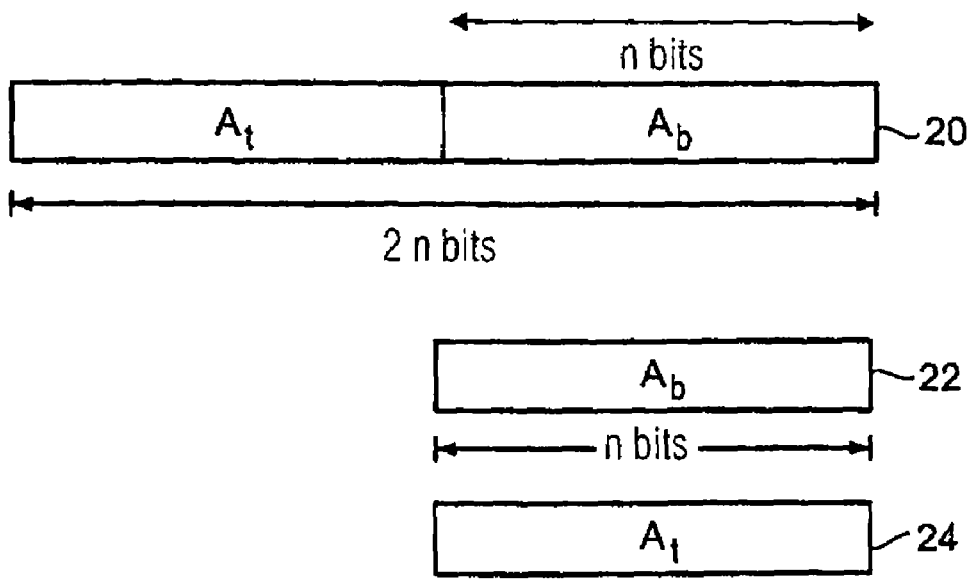
FIG. 2 shows a representation of the operands A, $A_t$, $A_b$ for sub-operands of half the length.

The mode of operation of the means 10 for providing will be explained below in more detail with reference to FIG. 2. FIG. 2 shows a first register 20 with a length of 2 n bits for storing, for example, the first operand A. The means 10 for providing generate the first sub-operand $A_b$ of the operand A by copying the first x bits, x equaling n in the preferred embodiment, into a sub-operand register 22, whereas the residual bits of the register 20, $A_t$, are copied into a second sub-operand register 24. The first and second sub-operands are thus obtained by simply dividing the bits of the underlying long-number operand. The numbers from the two sub-operand registers 22 and 24 therefore again result in the original operand in accordance with the equation shown in FIG. 2, i.e. by writing the first operand $A_b$ into a result register A, and by writing the second operand $A_t$ into the result register, too, however shifted to the left by n bits, as is represented by the factor $2^n$.

Figure 3:
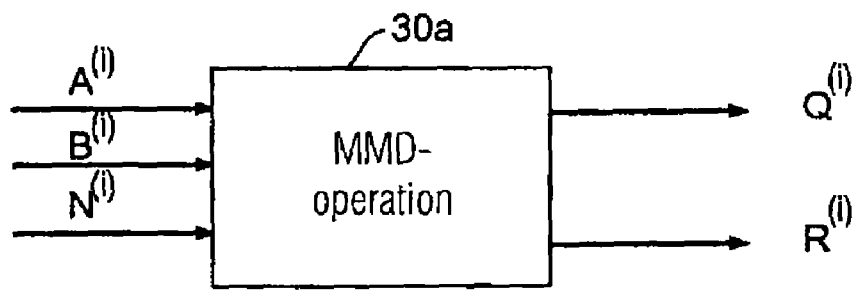
FIG. 3 shows a schematic representation of the MMD operation.

FIG. 3 shows a more detailed representation of the mode of operation of the MMD means 12. Same includes, in particular, an MMD operator 30 for performing an MMD operation, "MMD" standing for "MultModDiv". The MMD operation generates the integer quotient value $Q^{(i)}$ as well as a residual value $R^{(i)}$ from three input values $A^{(i)}$, $B^{(i)}$ and $N^{(i)}$ as a modulus, the residual value R being defined by the mod operation as usual, whereas the quotient value Q corresponds to the integer result of the division of A*B by N. Thus, the MMD operation transforms the product A*B into the sum formed of the product of the integer quotient and of the modulus and of the residual value. The index (i) in superscript symbolizes a specific step i in the predetermined step sequence performed by the control means 14 to control the MMD means 12 in a suitable manner.

In a preferred embodiment of the present invention it is preferred that the predetermined step of sequence not only include MMD operations, but also performs at least one initializing MMD operation in addition to the MMD operations. The initializing MMD operation is defined by an equation denoted as 40 in FIG. 4. The operation transforms an expression $A*B+C*2^n$ into a representation of an integer quotient multiplied by modulus and remainder. C is any desired number. With regard to its value n, the index n corresponds to the example described above, wherein the original operands A, B, N have a length of 2 n bits, and wherein the sub-operands and/or sub-moduli have a length of n bits. If a division different from halving the operands is used, n would have to be replaced by the value x in FIG. 4, x equaling the number of bits of the first sub-operands $A_b$, $B_b$ and/or of the sub-modulus $N_b$. The integer remainder A is defined as is represented in equation 42 of FIG. 4. In addition, the integer quotient Q is defined as is represented in equation 44 in FIG. 4. An initializing MMD operator 30b thus performs a so-called initializing MMD operation with an expression exhibiting the input operands $A^{(i)}$, $B^{(i)}$, $N^{(i)}$, $C^{(i)}$ and n so as to generate the integer quotient $Q^{(i)}$ and the residual value $R^{(i)}$ as output values.

It shall be pointed out that the initializing MMD operation is a specifically defined operation which may be implemented also in the MMD means 12 of FIG. 1 if the predetermined step sequence is to include an initializing MMD operation in addition to an MMD operation. In this case, the MMD means 12 of FIG. 1 would also be provided with the parameter C as well as the parameter n as the input variable.

With reference to FIG. 5, a description will be given below of a step sequence comprising seven MultModDiv operations for calculating the result of the modular multiplication of A*B mod N using merely an MMD unit 12 of FIG. 1 and combining means 16 of FIG. 1 with a shorter bit length (preferably half the bit length). In a first step 51, a first integer quotient $Q^{(i)}$ as well as a first residual value $R^{(i)}$ are calculated using the input operands $B_t$ and $2^n$ as well as the MMD modulus $N_t$. In a second step 52, a second quotient value as well as a second residual value are calculated using the first residual value and the first sub-modulus $N_b$ as input operands, and using the number $2^n$ as the MMD modulus. As is represented in FIG. 5, this procedure is continued with steps 53, 54, 55, 56, and 57 to receive, eventually, a seventh integer quotient value $Q^{(7)}$ as well as a seventh residual value $R^{(7)}$, which is obtained from an MMD operation using the first sub-operand $A_b$ of the first operand A, and the second sub-operand $B_b$ of the second operand B as well as the number $2^n$ as the MMD modulus.

An equation 58 of FIG. 5 bearing the heading "output" represents the combining operation of the combining means 16 of FIG. 1. In particular, the combining means form a first sum of residual values $R^{(7)}-R^{(6)}-R^{(5)}$ as a first sum. The combining means 16 of FIG. 1 further calculate a sum of $R^{(3)}+R^{(4)}-Q^{(5)}-Q^{(6)}+Q^{(7)}$ as a second sum. As is represented in FIG. 5, the second sum is multiplied by the factor $2^n$ and subsequently added with the first sum. As is represented by means of FIG. 11, this operation may also be implemented by an n-bits calculating unit, that is to say a calculating unit of a short length.

It is evident from FIG. 5 that only seven MMD operations are required in the predetermined step sequence shown in FIG. 5 which have the corresponding combinations of input operands and MMD moduli. If B is known in advance, as is usually the case, the first two MMD operations may be calculated in advance, so that an online performance of 5 MMD operations results. Particular attention shall be given to the third step 53 of the predetermined step sequence. In this step, the expression $R^{(1)}-Q^{(2)}+B_b$ is used as the second input operand for the MMD operation. This expression may become negative, so that $Q^{(3)}$ and $Q^{(5)}$ (fifth step 55 of FIG. 5) may also become negative. In this case it is preferred to take adequate precautions which are common and known in the field of modular arithmetic for those cases wherein negative values occur, such as, for example, adding a modulus, so as to bring a negative result into the correct residual class, that is to say into the residual class between 0 and the modulus underlying the calculation.

Figure 4:
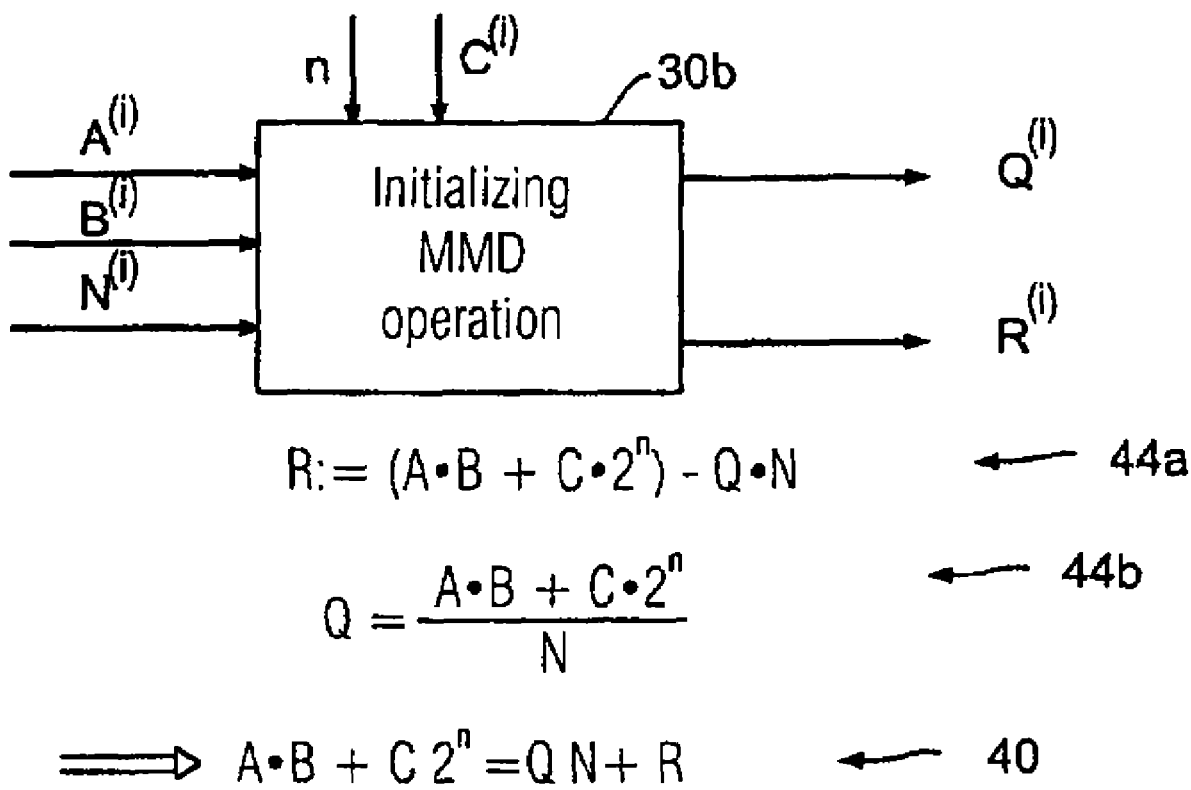
FIG. 4 shows a schematic representation of the initializing MMD operation.

FIG. 6 shows an alternative predetermined sequence, wherein the initializing MMD operator 30b of FIG. 4 is employed in addition to the MMD operator 30a of FIG. 3. While in a first step 61 of the predetermined step sequence shown in FIG. 6, a first quotient value $Q^{(1)}$ and a first residual value $R^{(1)}$ are calculated from an MMD operation with $A_t$, $B_t$ and an MMD modulus $N_t$, an initializing MMD operation (MultModDivInt) takes place in step 62, to be precise with the first input operand $N_b$ as the first input operand (corresponding to A of FIG. 4), with $-Q^{(1)}$ as the second input operand (corresponding to B of FIG. 4), with $R^{(1)}$ as the third input operand (corresponding to C of FIG. 4) and with the second sub-modulus $N_t$ as the MMD modulus (corresponding to N of FIG. 4).

It can be seen from FIG. 6 that, unlike FIG. 5, merely six MMD operations are required, wherein one operation, to be precise the second operation in the second step 62, is an initializing MMD operation. It shall further be pointed out that $Q^{(2)}$ may become negative, it being possible that here, again, the above-described measures to be taken for negative variables might have to be employed.

Figure 11:
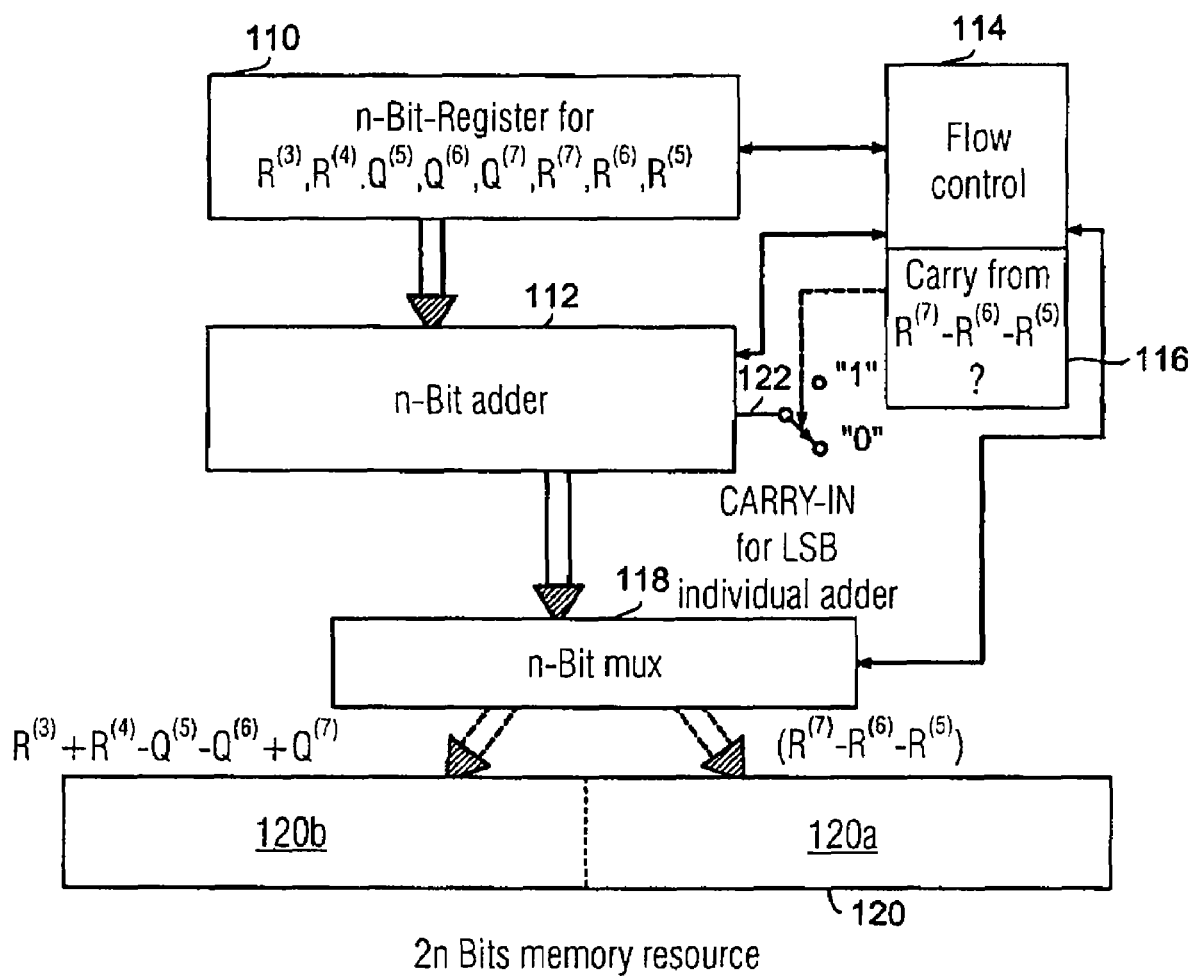
FIG. 11 shows a block diagram of an inventive combining means.

In a line 67 of FIG. 6, the task to be performed by the combining means 16 of FIG. 1 is again represented, the task comprising forming the first sum of $R^{(5)}$ and $-R^{(6)}$, forming the second sum of $R^{(2)}+R^{(3)}+R^{(4)}+Q^{(5)}-Q^{(6)}$ to obtain the second sum, and to combine the first and second sums, if need be taking into account a carry, as will be explained in detail below with reference to FIG. 11.

Figure 7:
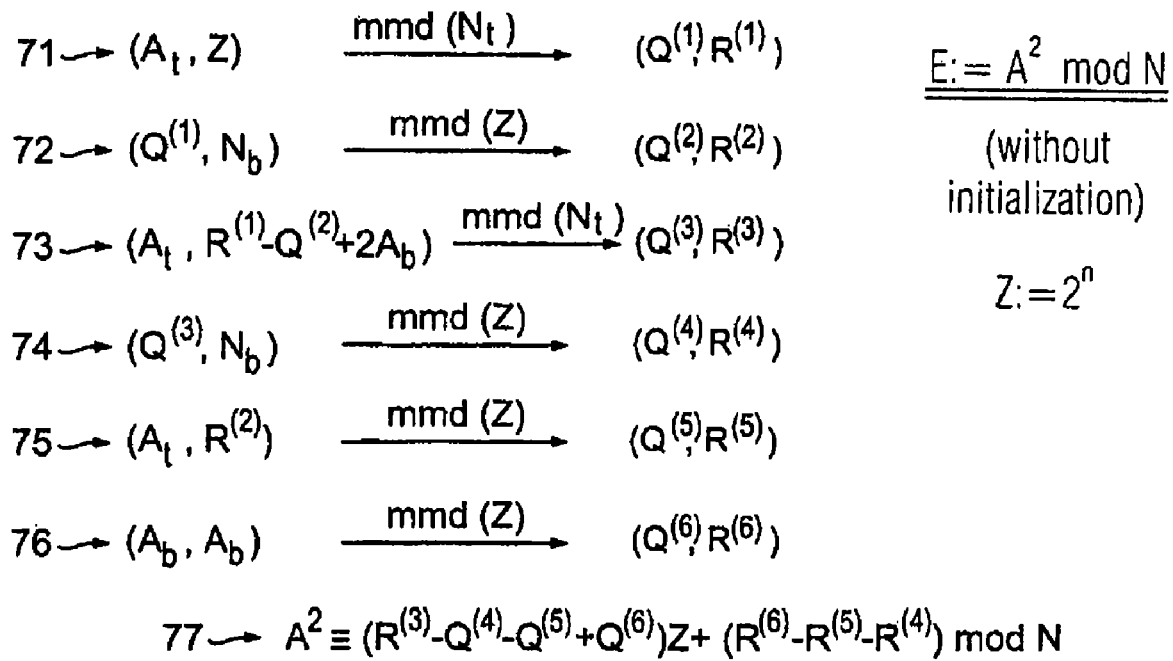
FIG. 7 shows a preferred embodiment for a predetermined step sequence, wherein only MMD operations used.

FIG. 7 represents a predetermined step sequence comprised of steps 71, 72, 73, 74, 75, 76 for calculating the result of squaring the operand A. In this case, the first operand corresponds to the second operand, i.e. the first and second operands are identical. It can be seen from FIG. 7 that in the squaring algorithm shown in FIG. 7, no MMD operation with initialization is used, and that on the whole six MMD operations are sufficient, as opposed to seven MMD operations needed if the first and second operands are not identical. In addition, it shall be pointed out that due to the difference existing in the third step 73, both the third quotient value $Q^{(3)}$ and the fourth quotient value $Q^{(4)}$ may become negative.

Figure 8:
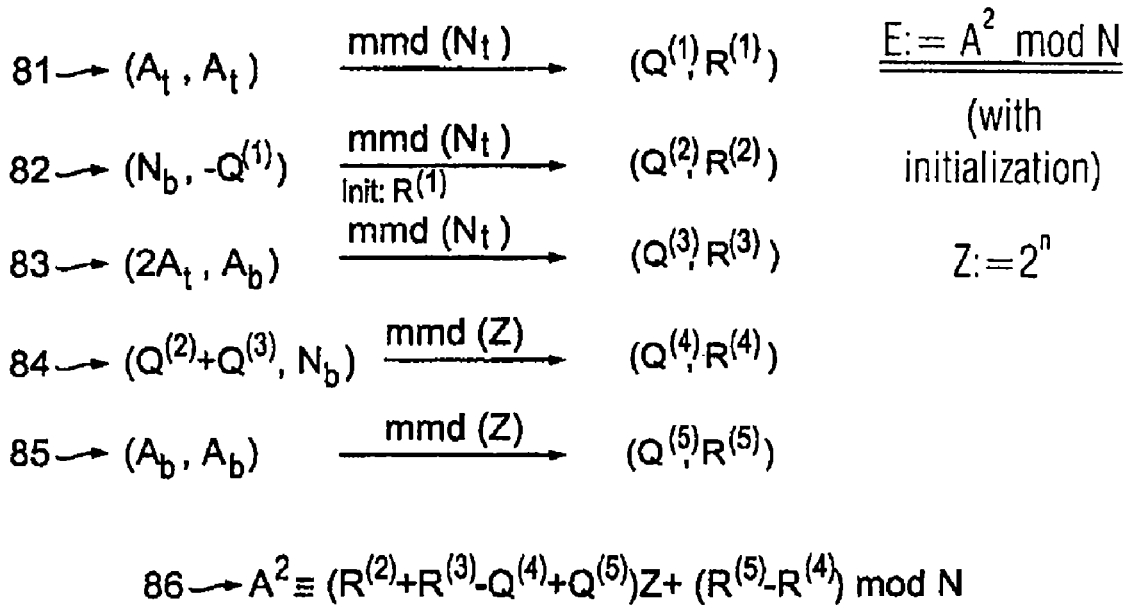
FIG. 8 shows a preferred embodiment for a predetermined step sequence for squaring, wherein an initializing MMD operation is used.

FIG. 8 shows a predetermined step sequence in accordance with an alternative embodiment, wherein an initializing MMD operation is again used in the second step 82 of the predetermined step sequence, the first and second input operands being $N_b$ and $-Q^{(1)}$, respectively, the third input operand (corresponding to C in FIG. 4) being the first residual value $R^{(1)}$, and the first sub-modulus $N_t$ being used as the MMD modulus. If an initializing MMD operation is used, five MMD operations result, as opposed to six MMD operations of FIG. 7 without initialization. Again, it shall be pointed out that the second integer quotient value $Q^{(2)}$ may become negative.

An exemplary derivation for various predetermined step sequences will be referred to below by means of FIGS. 9a, 9b.

In particular, FIG. 9a shows a derivation of the predetermined step sequence, shown in FIG. 5, for a multiplication without initialization. FIG. 9b, in contrast, shows a derivation of the predetermined step sequence, represented in FIG. 6, for a multiplication with initialization, that is to say a multiplication wherein an initializing MMD operation occurs in a step of the predetermined step sequence.

FIG. 10 shows a derivation of the predetermined step sequence of FIG. 7 for a squaring without initialization, that is to say only with mere MMD operations, without performing any initializing MMD operation in any step of the predetermined step sequence.

Each of the derivations of FIGS. 9a, 9b and 10 starts by setting up the relevant product to be calculated, however now taking into account the links represented in FIG. 2, namely the fact that the first and second operands A, B already have been replaced by the respective first and second sub-operands, as can be seen from 90a of FIG. 9a, from 90b of FIG. 9b and from 100 of FIG. 10. In particular, a product from a first term $A_t*Z+A_b$ and a second term $B_t*Z+B_b$ is set up and multiplied out.

In the following, reference is made in an exemplary fashion to FIG. 9a. Multiplying out results in a line 91 in FIG. 9a. By way of example, the product $B_t*Z$ in the first term of line 91 of FIG. 9a undergoes an MMD operation, Z corresponding to the number $2^n$, as is represented on the right-hand side in FIGS. 9a, 9b and 10. The first sub-modulus $N_t$ of the modulus is used as the MMD modulus for this first MMD operation. Thus, a second line 92 is obtained in which the first integer quotient $Q^{(1)}$ and the first integer remainder $R^{(1)}$ occur. In a line 93, use is then made of a relation to be found to the right of line 93, which relation states that the first sub-modulus $N_t$ multiplied by Z equals the negative of the second sub-modulus $N_b$ mod N. This link results from the following conditional equation:

$$N=N_t*Z+N_b.$$

If $N_b$ is subtracted from the entire equation, the following equation results:

$$N-N_b=N_t*Z.$$

If this equation is reduced, the N on the left-hand side in the above equation is eliminated, so that the following equation results:

$$N_t*Z=-N_b \bmod N.$$

By employing the above-described conditional equation for multiplying out the first bracket in FIG. 92, wherein the factor $Q^{(1)}*N_t*A_t*Z$ results, this factor becomes $-A_t*Q^{(1)}*N_b$, as can be seen from a line 93 of FIG. 9a when taking into account the second term of line 93 of FIG. 9a. In a line 94 of FIG. 9a, this second term now undergoes an MMD operation (step 52 of FIG. 5) to get to a line 94. Hereafter, the above-described link between $N_t*Z$ and $-N_b$ is again taken into account. This procedure is repeated several times. The partial products that came into being in line 91 are thus processed step by step using MMD operations, so that merely products of numbers of a length of n bits and of a factor $2^n$, or numbers of a length of n bits remain, as can be seen from the last line of FIG. 9a, which corresponds to line 58 of FIG. 5.

The derivation example shown in FIG. 9a corresponds to the predetermined step sequence of FIG. 6, i.e. to the general multiplication with initialization. A MultModDivInt, that is an initializing MMD operation, is performed in a line 95, to be precise with the first term of FIG. 9b. The first operand (corresponding to A of FIG. 4) is $N_b$, the second operand (corresponding to B in FIG. 4) is the value $-Q^{(1)}$, the third operand (corresponding to C of FIG. 4) is $R^{(1)}$, whereas the number Z corresponds to $2^n$, as has been explained. The result of the initializing MMD operation is shown in the first term of line 96 of FIG. 9b.

FIG. 10 gives a corresponding derivation without initialization for a squaring, that is to say for the predetermined step sequence represented in FIG. 7, which, in principle, is again performed in a manner similar to the derivations shown in FIGS. 9a and 9b.

It is evident from the above representation that any predetermined step sequences may be formed using the sum multiplication approach (90a, 90b, 100) due to the manifold possibilities of mathematical transformation, so as to resolve the operation shown in the "sum-product approach", so that only quotient values and residual values having a length of n bits, and/or appropriate quotient values and residual values multiplied by $2^n$, will remain. The only operation required in addition to a normal addition is merely an MMD operation or optionally also an initializing MMD operation, which, however, also require merely a length of x (preferably n) bits.

For practical reasons, for example in order to be able to handle a carry or a negative number, it is preferred to make the calculating unit for performing the MMD operation, the initializing MMD operation or the operation performed by the combining means 16 by a few bits, e.g. 1 or 2 bits, larger than n bits. However, this is not a problem if the dimensions are taken into account, namely the fact that now 2 n-bits operands may be calculated in an efficient and clear-cut manner on an n-bits calculating unit requiring a few bits more for practical implementations, which additional bits, however, are negligible compared to the saving of 1024 bits and/or with regard to the possibility of being able to run a secure algorithm on existing apparatus.

A preferred embodiment of the combining means 16 shown in FIG. 1 will be dealt with below with reference to FIG. 11. The combining means serve to transform, in terms of circuit engineering, line 58 of the predetermined step sequence of FIG. 5, line 67 of the predetermined step sequence of FIG. 6, line 77 of the predetermined step sequence of FIG. 7, or line 86 of the predetermined step sequence of FIG. 8. This will be set forth below with reference to line 58 of FIG. 5.

Combining means 16 include a plurality of n-bits registers 110 for the residual values $R^{(3)}$ and $R^{(4)}$, $R^{(5)}$, $R^{(6)}$ and $R^{(7)}$ as well as for the quotient values $Q^{(5)}$, $Q^{(6)}$ and $Q^{(7)}$, which are used for the combining operation. The other residual values and/or quotient values are needed merely as intermediate results, namely from one step of the predetermined step sequence to the next or to a subsequent step of the predetermined step sequence. The registers represented in FIG. 11, however, are required for the eventual combining operation 58.

The combining means further include an n-bits adder (or, as has been explained, about 1 to 2 bits more than n bits) denoted as 112, a flow control 114, carry verification means 116 as well as an n-bits multiplexer 118 to write a result obtained into a 2 n-bits memory location 120.

The flow control 114 initially controls the register file 110 as well as the n-bits adder to calculate the first sum, that is of $R^{(7)}-R^{(6)}-R^{(5)}$. For this calculation, the carry input 122 of the least significant bit (lsb) of the individual adder is initialized to a value of "0". Hereafter, the carry of the most significant bit of the first sum is examined.

If it is found that the msb (msb=most significant bit) of the n-bits adder 112 comprises a carry bit of "0", no changes are made to the carry input of the lsb individual adder; this input continues to be initialized to "0".

However, if it is found that the first sum provides a carry, the second sum $R^{(3)}+R^{(4)}-Q^{(5)}-Q^{(6)}+Q^{(7)}$ is calculated, to be precise with a carry initialized to "1". The first sum is written into low-order bits 120a of the 2 n-bit memory location by the n-bits multiplexer controlled by the flow control 114, whereas after calculating the second sum, same is written into the remaining vacant high-order bits 120b of the 2 n-bit memory location 120 with a carry input initialized accordingly for the least significant individual adder. The multiplication by the factor $2^n$ therefore is implemented by the n-bits multiplexer 118 in the embodiment shown in FIG. 11. Of course, this operation may also be implemented by a register shifter or the like, as is known in the art.

It becomes clear from the above explanation of the inventive concept that a plurality of any further derivations desired and/or a plurality of further predetermined step sequences may be inferred from the derivations set forth in FIGS. 9a, 9b and 10, so as to perform, with a calculating unit whose length is shorter than the length of the input variables A, B, N, a modular multiplication merely using MMD operations or using MMD operations and one or several initializing MMD operations.

In the examples shown in FIGS. 9a, 9b and 10, and/or in the various embodiments for predetermined step sequences it has been preferred to use only the first sub-modulus $N_t$ as well as the number $2^n$, but not the second sub-modulus $N_b$, as the MMD modulus. It is obvious for those skilled in the art that the above derivation also applies to other numbers Z than $2^n$, as long as the factorization of the modulus into the sub-moduli is selected in correspondence with the number Z.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A cryptographic apparatus for calculating a result of a modular multiplication of a first operand and a second operand in relation to a modulus, the first operand, the second operand and the modulus each having a first length of 2n bits, n being an integer, the apparatus comprising:
 a provider configured to provide a first sub-operand and a second sub-operand from the first operand, a first tub-operand, a second sub-operand from the second operand, and a first sub-modulus and a second sub-modulus from the modulus, each having a second length of bits which is shorter than the first length of bits, wherein the provider comprises input registers for the operands having a length of 2n bits and output registers for the sub-operands having a length being shorter than 2n bits;

an MultModDiv unit configured to perform an MultModDiv operation, the MultModDiv operation being defined o provide, from a term, an integer quotient value and a residual value with regard to an MultModDiv modulus, wherein the MultModDiv unit is an arithmetic unit having a length shorter than 2n bits;

a controller configured to feed the MultModDiv unit with predetermined combinations of input operands and associated MultModDiv moduli in accordance with a predetermined step sequence, the input operands and MultModDiv moduli being based on the first and second sub-operands of the first operand, on the first and second sub-operands of the second operand, on the first and second sub-moduli of the modulus, on integer quotient values and residual values from steps in the predetermined step sequence, and on a factor $2^n$, x equaling the second length of bits; and a combiner configured to combine integer quotient values and residual values from predetermined steps of the step sequence so as to obtain the result, wherein the combiner comprises a bit adder having a bit length shorter than 2n bits, wherein the combiner comprises input registers for the integer quotient values and the residual values, the input registers being shorter than 2n bits, wherein the combiner comprises a output memory having 2n bits configured to store the result, and wherein the result is an intermediate result of encrypted/decrypted data.

2. The apparatus as claimed in claim 1, wherein the sub-operands and sub-moduli have a length of n bits, wherein the MultModDiv unit has a length of n+ϵ bits, ϵ being shorter than 10, and wherein the combiner is an arithmetic unit with a length of n bits.

3. The apparatus as claimed in claim 1, wherein the controller is configured to feed the MultModDiv unit in accordance with the following predetermined step sequence:

feeding $B_t$ and $2^n$ as input operands and $N_t$ as an MultModDiv modulus to obtain a first integer quotient value $Q^{(1)}$ and a first residual value $R^{(1)}$, wherein $B_t$ is the first sub-operand from the second sub-operand, 2n is the first length, and $N_t$ is the sub-modulus;

feeding $Q^{(1)}$ and $N_b$ as input operands and $2^n$ as an MultModDiv modulus to obtain a second integer quotient value $Q^{(2)}$ as well as a second residual value $R^{(2)}$ wherein $N_b$ is the second sub-modulus;

feeding $A_t$ and the sum of $R^{(1)}-Q^{(2)}+B_b$ as input operands and $N_t$ as an MultModDiv modulus to obtain a third quotient value $Q^{(3)}$ and a third residual value $R^{(3)}$, wherein $A_t$ is the first sub-operand of the first operand, and $B_b$ is the second sub-operand from the second operand;

feeding $A_b$ and $B_t$ as input operands and $N_t$ as an MultModDiv modulus to obtain a fourth integer quotient value $Q^{(4)}$ and a fourth residual value $R^{(4)}$, wherein $A_b$ is the second sub-operand of the first operand;

feeding a sum of $Q^{(3)}+Q^{(4)}$ and $N_b$ as input operands and $2^n$ as an MultModDiv modulus to obtain a fifth integer quotient value $Q^{(5)}$ and a fifth residual value $R^{(5)}$;

feeding $A_t$ and $R^{(2)}$ as input operands and $2^n$ as an MultModDiv modulus to obtain a sixth integer quotient value $Q^{(6)}$ and a sixth residual value $R^{(6)}$; and feeding $A_b$, $B_b$ as input operands and $2^n$ as an MultModDiv modulus to obtain a seventh integer quotient value $Q^{(7)}$ and a seventh residual value $R^{(7)}$, wherein the combiner is configured to form a first sum of $R^{(3)}+R^{(4)}-Q^{(5)}-Q^{(6)}+Q^{(7)}$, to form a second sum of $R^{(7)}-R^{(6)}-R^{(5)}$ and to combine the first sum and the second sum.

4. The apparatus as claimed in claim 3, wherein the MultModDiv unit is configured to perform the feeding of $B_t$ and $2^n$, the feeding of $A_b$ and $B_t$, and the feeding of $A_b$, $B_b$ in parallel.

5. The apparatus as claimed in claim 1, wherein the controller is configured to feed the MultModDiv unit in accordance with the following predetermined step sequence for a calculation of the modular multiplication with identical first and second operands:

feeding $A_t$ and $2^n$ as input operands and $N_t$ as an MultModDiv modulus to obtain a first integer quotient value $Q^{(1)}$ and a first residual value $R^{(1)}$, wherein $A_t$ s the first sub-operand from the first operand, $2^n$ is the first length, and $N_t$ is the sub-modulus;

feeding $Q^{(1)}$ and $N_b$ as input operands and $2^n$ as an MultModDiv modulus to obtain a second integer quotient value $Q^{(2)}$ and a second residual value $R^{(2)}$, wherein $N_b$ is the second sub-modulus;

feeding $A_t$ and a sum of $R^{(1)}-Q^{(2)}+2*A_b$ as input operands and $N_t$ as an MultModDiv modulus to obtain a third integer quotient value $Q^{(3)}$ and a third residual value $R^{(3)}$, wherein $A_b$ is the second sub-operand from the first operand;

feeding $Q^{(3)}$ and $N_b$ as input operands and $2^n$ as an MultModDiv modulus to obtain a fourth integer quotient value $Q^{(4)}$ and a fourth residual value $R^{(4)}$;

feeding $A_t$ and $R^{(2)}$ as input operands and $2^n$ as an MultModDiv modulus to obtain a fifth integer quotient value $Q^{(5)}$ and a fifth residual value $R^{(5)}$; and feeding $A_b$ as a first input operand and as a second input operands and $2^n$ as an MultModDiv modulus to obtain a sixth integer quotient value $Q^{(6)}$ and a sixth residual value $R^{(6)}$, wherein the combiner is configured to calculate a first sum of $R^{(3)}-Q^{(4)}-Q^{(5)}+Q^{(6)}$ as well as a second sum of $R^{(6)}-R^{(5)}-R^{(4)}$ and to obtain a result from the first sum and the second sum.

6. The apparatus as claimed in claim 1, wherein the MultModDiv unit further comprises an initializing MultModDiv operation configured to calculate, from a sum of two addends, an integer quotient value with regard to a modulus, as well as a residual value, a first addend equaling a product of a first input operand and a second input operand, the second addend equaling a product of a third input operand and a number $2^n$, and wherein the controller is configured to control, in one step in the predetermined step sequence, the initializing MultModDiv operation.

7. The apparatus as claimed in claim 6, wherein the controller is configured to feed the MultModDiv unit in accordance with the following predetermined step sequence:

feeding $A_t$, $B_t$ as input operands and $N_t$ as an MultModDiv modulus to obtain a first integer quotient value $Q^{(1)}$ and a first residual value $R^{(1)}$, wherein $A_t$ is the first sub-operand from the first operand, $B_t$ is the first sub-operand of the second operand, and $N_t$ is the first sub-modulus;

feeding $N_b$, $-Q^{(1)}$, $R^{(1)}$ as input operands and $N_t$ as an MultModDiv modulus into the initializing MultModDiv unit to obtain a second integer quotient value $Q^{(2)}$ and a second residual value $R^{(2)}$, wherein $N_b$ is the second sub-modulus;

feeding $A_t$, $B_t$ as input operands and $N_t$ as an MultModDiv modulus to obtain a third integer quotient value $Q^{(3)}$ and a third residual value $R^{(3)}$ wherein $A_b$ is the second sub-operand of the first operand;

feeding $A_b$, $B_t$ as input operands and $N_t$ as an MultModDiv modulus to obtain a fourth integer quotient value $Q^{(4)}$ and a fourth residual value $R^{(4)}$;

feeding $A_b$, $B_b$ as input operands and $2^n$ as an MultModDiv modulus to obtain a fifth integer quotient value $Q^{(5)}$ and a fifth residual value $R^{(5)}$, wherein 2n is the first length, and $B_b$ is the second sub-operand of the second operand; and feeding a sum of $Q^{(2)}+Q^{(3)}+Q^{(4)}$ as well as $N_b$ as input operands and $2^n$ as an MultModDiv modulus to obtain a sixth integer quotient value $Q^{(6)}$ and a sixth residual value $R^{(6)}$, wherein the combiner is configured to calculate a first sum of $R^{(2)}+R^{(3)}+R^{(4)}+Q^{(5)}-Q^{(6)}$ as well as a second sum of $R^{(5)}-R^{(6)}$ to obtain the result based on the first sum and the second sum.

8. The apparatus as claimed in claim 6,
wherein the first operand equals the second operand for calculating a modular squaring operation $A^2$ mod N, wherein A is the first operand, and N is the modulus,
wherein the controller is configured to feed the MultModDiv unit in accordance with the following predetermined step sequence:

feeding $A_t$ as input operands and $N_t$ as an MultModDiv modulus to obtain a first integer quotient value $Q^{(1)}$ and a first residual value $R^{(1)}$, wherein $A_t$ is the first sub-operand of the first operand, and $N_t$ is the first sub-modulus;

feeding $N_b$, $-Q^{(1)}$, $R^{(1)}$ as input operands and $N_t$ as an MultModDiv modulus into the initializing MultModDiv unit to obtain a second integer quotient value $Q^{(2)}$ and a second residual value $R^{(2)}$, wherein $N_b$ is the second sub-modulus;

feeding $2A_t$, $B_b$ as input operands and $N_t$ as an MultModDiv modulus to obtain a third integer quotient value $Q^{(3)}$ and a third residual value $R^{(3)}$, wherein $A_b$ is the second sub-operand of the first operand;

feeding a sum of $Q^{(2)}+Q^{(3)}$ as well as $N_b$ as input operands and $2^n$ as an MultModDiv modulus to obtain a fourth integer quotient value $Q^{(4)}$ and a fourth residual value $R^{(4)}$, wherein 2n is the first length; and feeding $A_b$ as input operands and $2^n$ as an MultModDiv modulus to obtain a fifth integer quotient value $Q^{(5)}$ and a fifth residual value $R^{(5)}$;

wherein the combiner is configured to calculate a first sum of $R^{(2)}+R^{(3)}-Q^{(4)}+Q^{(5)}$ as well as a second sum of $R^{(5)}-R^{(4)}$ to obtain the result of the modular squaring operation.

9. The apparatus as claimed in claim 1,
wherein the controller is configured to select the predetermined step sequence such that only numbers of a length shorter than 2n bits will remain after a plurality of steps.

10. The apparatus as claimed in claim 1,
wherein the controller is configured to use a predetermined step sequence derived by the following steps:

multiplying out a product of a first term and a second term, the first term comprising a first sub-operand and a second sub-operand of the first operand, and the second term comprising a first sub-operand and a second sub-operand of the second operand, to obtain partial products; and processing the partial products in a step-by-step manner using MultModDiv operations to obtain only products of numbers of a length shorter than n bits with a factor $2^n$, or numbers of a length shorter than 2n bits.

11. The apparatus as claimed in claim 1,
wherein the controller is configured to feed the MultModDiv unit with the first sub-modulus or a number $2^x$ merely as MultModDiv moduli, x equaling the second length of bits.

12. The apparatus as claimed in claim 1,
wherein the combiner is configured to calculate a first sum of residual values from predetermined steps of the predetermined step sequence,
to calculate a second sum of residual values and integer quotient values from predetermined steps of the predetermined step sequence,
to write the first sum into low-order bits of the result memory, and
to write the second sum into high-order bits of the result memory.

13. The apparatus as claimed in claim 12,
wherein the combiner is configured
to ascertain whether the first sum provides a carry, and
in the event that the first sum provides a carry, to calculate the second sum with a carry equaling "1" at a carry input of an adder.

14. A cryptographic method performed by an apparatus for calculating a result of a modular multiplication of a first operand and a second operand in relation to a modulus, the first operand, the second operand and the modulus each having a first length of 2n bits, n being an integer, the method comprising:

providing a first sub-operand and a second sub-operand from the first operand, a first sub-operand and a second sub-operand from the second operand, a first sub-modulus and a second sub-modulus from the modulus, each having a second length of bits which is shorter than the first length of bit;

wherein the step of providing comprises providing horn input registers for the operands having a length of 2n bits into output registers for the sub-operands having a length being shorter than 2n bits;

performing an MultModDiv operation, which is defined to provide, from a term, an integer quotient value and a residual value with regard to an MultModDiv modulus using an arithmetic unit having a length shorter than 2n bits;

feeding the MultModDiv unit with predetermined combinations of input operands and associated MultModDiv moduli in accordance with a predetermined step sequence, the input operands and MultModDiv moduli being based on the first and second sub-operands of the first operand, on the first and second sub-operands of the second operand, on the first and second sub-moduli of the modulus, on/integer quotient values and residual values from steps in the predetermined step sequence, and on a factor $2^x$, x equaling the second length of bits;

combining integer quotient values and residual values from predetermined steps of the step sequence to obtain the result using an arithmetic unit having a length shorter than 2n bits, wherein the integer quotient values and the residual values are stored in input register, the input registers being shorter than 2n bits; and storing the result in an output memory having 2n bits, wherein the result is an intermediate result of encrypted/decrypted data.

* * * * *

UNITED STATES PATENT AND TRADEMARK OFFICE
CERTIFICATE OF CORRECTION

PATENT NO.        : 7,558,817 B2
APPLICATION NO.   : 10/977561
DATED             : July 7, 2009
INVENTOR(S)       : Wieland Fischer et al.

Page 1 of 1

It is certified that error appears in the above-identified patent and that said Letters Patent is hereby corrected as shown below:

At column 11, Claim 1, line 5 delete "o" and insert -- to -- therefor

At column 12, Claim 5, line 19 delete "s" and insert -- is -- therefor

At column 14, Claim 14, line 37 delete "bit" and insert -- bits -- therefor

At column 14, Claim 14, line 38 delete "horn" and insert -- from -- therefor

At column 14, Claim 14, line 53 delete "on/integer" and insert -- on integer -- therefor At column 14, Claim 14, line 61 delete "register" and insert -- registers -- therefor Signed and Sealed this Twenty-fourth Day of November, 2009

David J. Kappos
*Director of the United States Patent and Trademark Office*